United States Patent [19]

Kinkel et al.

[11] Patent Number: 4,828,312

[45] Date of Patent: May 9, 1989

[54] COLLAPSIBLE SECURITY STORAGE APPARATUS FOR TRUCK BEDS

[75] Inventors: Stephen W. Kinkel; Peter J. Kinkel, III, both of Phoenix, Ariz.

[73] Assignee: Superior Industries International, Inc., Van Nuys, Calif.

[21] Appl. No.: 124,078

[22] Filed: Nov. 23, 1987

[51] Int. Cl.⁴ .............................. B60R 5/04; B60R 9/06
[52] U.S. Cl. .................................. 296/37.6; 224/42.44; 16/94 R
[58] Field of Search ........................ 296/15, 37.5, 37.6, 296/37.16, 24 R, 27, 50, 55, 180.2, 180.3, 24.1; 224/42.03 A, 42.34, 42.42, 42.44, 314, 321; 16/90, 94 R, 96 R

[56] References Cited

U.S. PATENT DOCUMENTS

| | | | |
|---|---|---|---|
| 949,204 | 2/1910 | Stiehl | 296/37.5 |
| 1,179,445 | 4/1916 | Manning | 296/37.5 |
| 2,229,908 | 1/1941 | Wenneborg | 16/96 R |
| 2,271,309 | 1/1942 | Rowe | 16/94 R |
| 2,504,222 | 4/1950 | Otto . | |
| 2,722,352 | 11/1955 | Dehnel . | |
| 2,784,027 | 3/1957 | Temp . | |
| 2,867,471 | 1/1959 | Coon, Jr. | 224/42.42 |
| 2,978,153 | 4/1961 | Brindle | 224/42.42 |
| 3,068,038 | 12/1962 | Douglass, Jr. . | |
| 3,069,199 | 12/1962 | Reardon et al. | 296/100 |
| 3,245,713 | 4/1966 | Ogilvie | 296/24 R |
| 3,326,595 | 6/1967 | Ogilvie | 224/42.42 |
| 3,393,936 | 7/1968 | Hall . | |
| 3,664,704 | 5/1972 | Ellis | 224/42.42 |
| 3,731,860 | 5/1973 | David | 224/42.03 |
| 3,826,529 | 7/1974 | Wood | 296/24 R |
| 4,215,896 | 8/1980 | Drouin | 224/42.42 |
| 4,252,362 | 2/1981 | Campbell | 296/100 |
| 4,313,636 | 2/1982 | Deeds | 296/100 |
| 4,357,046 | 11/1982 | Lalanne | 296/37.16 |
| 4,451,075 | 5/1984 | Canfield | 296/37.6 |
| 4,506,870 | 3/1985 | Penn | 296/1 S |
| 4,580,827 | 4/1986 | Feagan | 296/37.6 |
| 4,749,226 | 6/1988 | Heft | 276/37.6 |
| 4,750,753 | 6/1988 | Dezeth | 224/42.44 |

*Primary Examiner*—Andres Kashnikow
*Assistant Examiner*—Timothy Newholm
*Attorney, Agent, or Firm*—Fulwider, Patton, Rieber, Lee & Utecht

[57] ABSTRACT

The storage apparatus is adapted for use with a truck bed, and includes a front panel and a top panel hinged together, with the bottom of the front panel hinged to the floor of the truck bed. The rear of the top panel latches with the rear tailgate of the truck, and rests upon tracks on the sidewalls of the truck bed. The top panel is dimensioned to fit snuggly within the tracks and preferably has adjustable brackets on the sides of the top plate panel to allow for fine adjustment of the fitting of the top panel with the tracks. Retaining brackets are also provided on the adjustable brackets of the top panel to fit around bolts securing the track to the sidewalls of the truck bed, to prevent the top panel from being lifted upwardly in either a closed or an intermediate open position. The front panel also has bent leg portions providing a recess into which the top panel may be folded, so that the top and front panels may be collapsed to lie flat upon the floor of the truck bed.

4 Claims, 2 Drawing Sheets

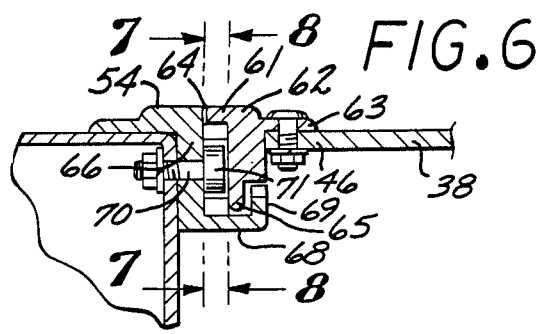
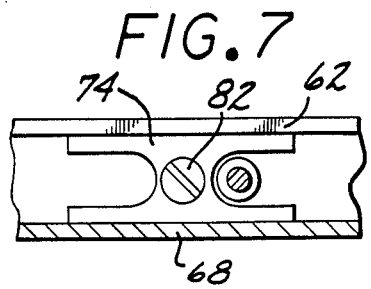
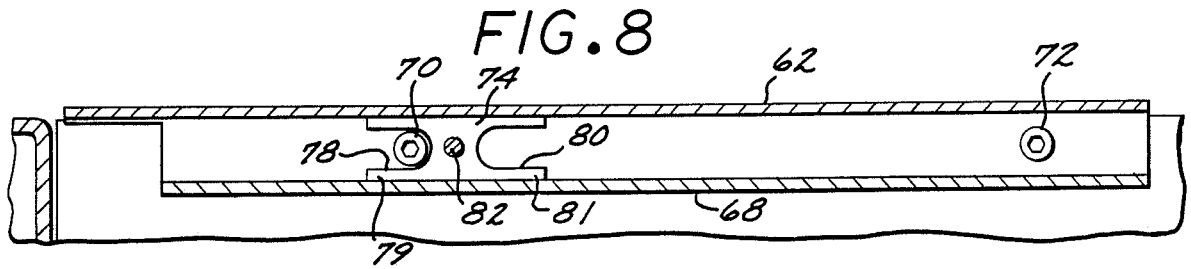
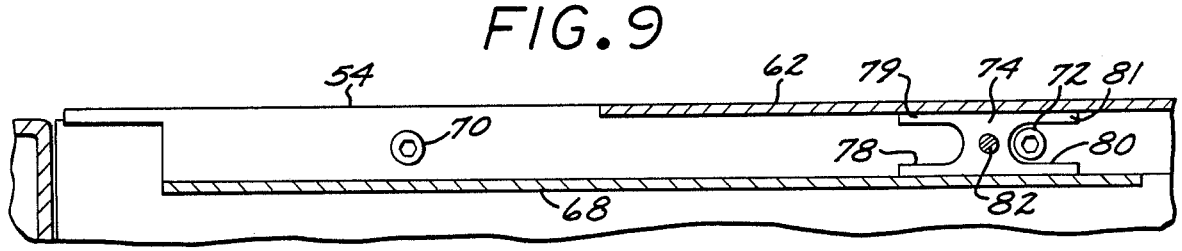
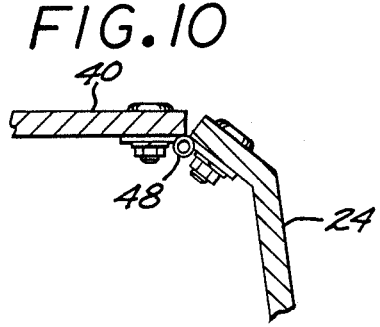
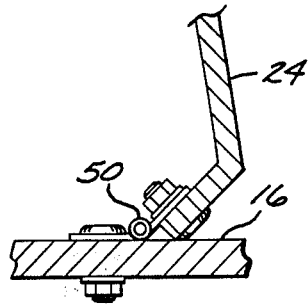
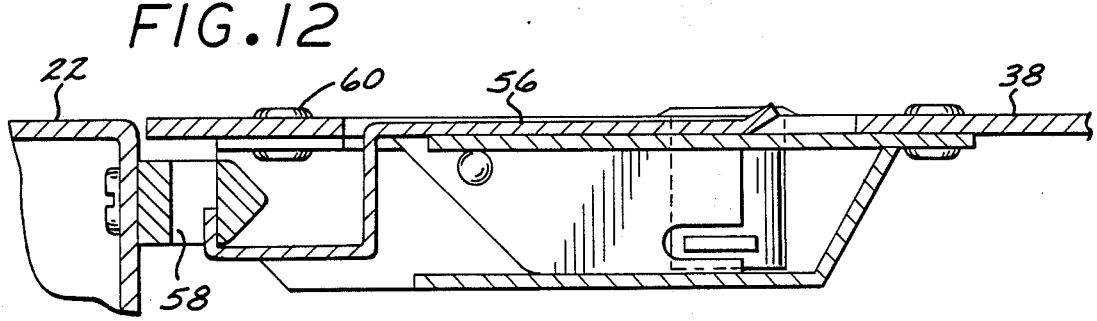

COLLAPSIBLE SECURITY STORAGE APPARATUS FOR TRUCK BEDS

BACKGROUND OF THE INVENTION (1) Field of the Invention

This invention relates generally to storage boxes for pick-up trucks, and more particularly to a collapsible security storage apparatus adapted for use in the truck bed of a pick-up truck, the storage apparatus having a folded configuration in which the unit may be made to lie flat on the truck bed, and having an unfolded configuration to form a security storage compartment.

(2) Prior Art

Theft of items from storage containers in the truck beds of unattended pick-up trucks has unfortunately been a not uncommon occurrence through the years. Various devices for efficiently and compactly securing and storing tools and equipment in trucks have been designed to prevent unauthorized removal of such items. Attempts have also been made to combine the high security features of such compartments with convertibility so that the storage compartment area or the truck bed area may be utilized for other purposes if necessary. However, it will be appreciated that the combination of high security and convertibility or even removability, though desirable, is difficult to achieve.

Typically, such designs have taken the form of a cover for the complete truck bed, which may be extended between the sidewalls of the truck bed, secured to the front wall and attached to the closed tailgate; one such device is disclosed n U.S. Pat. No. 4,273,377. The pick up bed cover may cover only a portion of the truck bed, leaving an open area in the truck bed, or slide along channels in the sidewalls, as in U.S. Pat. No. 4,252,362. The covers may have a portion attachable to the rear of the truck, so that the tailgate of the vehicle forms a closure with the container when the tailgate is raised. A box-like container of this type is disclosed in U.S. Pat. No. 4,215,896. The panel facing forward may also be slanted so as to reduce air drag normally caused by an upright tailgate, as is shown in U.S. Pat. Nos. 4,451,075 and 4,506,870. Other efforts have led to a compartment cover utilizing "C" shaped channels on opposite inner sidewalls having a portion of the upper part of the "C" shaped channel cut away to provide a lower shelf for the cover and allow for upward arcing of the cover while it is being inserted in the "C" channel. The "C" channel is necessarily wide enough to permit some vertical motion of the cover during insertion of the cover, and may be pried open. It would be desirable that the cover fit snugly in or on the brackets on the sidewalls of the truck bed, to prevent someone from prying the compartment open. It would also be desirable to provide some means for substantially preventing vertical movement of the cover once the cover is locked in place. Ideally, in order to prevent unauthorized access to such compartments, the compartment should be permanently secured in position to allow no opportunity for prying open a lid or a panel. However, the desirable features of removability or convertibility generally also endow such storage compartments with at least some areas where purchase may be gained for prying open the compartment. Conversely, the more permanent such a structure is in order to provide greater security, the less such a structure is generally capable of being collapsed or removed to allow full use of the space which a truck bed normally provides.

SUMMARY OF THE INVENTION

The present invention provides a collapsible security storage apparatus for use in combination with a truck bed, the apparatus having rigid, rectangular panel members which may be folded flat on the floor of the truck bed. One of the panel members may be dimensioned to fit snuggly against a track section which is secured to the truck bed walls, so that in its unfolded configuration the storage apparatus may be locked securely in position as a storage compartment, and alternatively folded away to lie flat on the truck bed floor.

Briefly and in general terms, a collapsible security storage apparatus according to the invention, for use in combination with a truck bed, comprises front and top rigid rectangular panels which may be extended between the right and left inner sidewalls of the truck bed, a hinge for mounting the bottom longitudinal edge of the front panel to the truck bed, a hinge for securing adjacent longitudinal edges of the two panels together, and track brackets formed of first and second legs meeting at approximately a right angle, the first leg being adapted to be secured to a sidewall and the second leg being adapted to receive an edge of the top panel, mounted on the right and left inner side walls for receiving the top panel, with the top panel being dimensioned to fit sufficiently close to the track to prevent purchase between the track and the top panel. A latch is also provided for securing the top panel to the rear tailgate in a raised position.

In a preferred embodiment, there are also adjustable brackets on the right and left edges of the top panel, so that the dimensions of the top panel may be adjusted to allow the top panel to fit as closely as possible to the inner sidewalls to prevent purchase between the top panel and the sidewalls, without binding. Thus, in its unfolded configuration, the top panel of the storage apparatus may slide upon the track on the sidewalls, for easy opening and closing of the compartment. The track brackets are preferably mounted on the right and left inner sidewalls of the truck bed by a pair of bolts extending through the brackets, and the adjustable brackets mounted on the top panel preferably include one or more H-shaped brackets having recesses in their front and rear portions adapted to fit around the heads of the bolts securing the track brackets to the sidewalls, to prevent substantially any movement of the top panel upwards from its position resting upon the side tracks. In this fashion, when the top panel is latched in its closed position to the rear tailgate, at least one H-shaped bracket fits around one of the mounting bolts to lock the top panel securely in position to prevent access. Once unlatched, the top panel may slide forward to allow at least one of the H-shaped members to encounter a mounting bolt, so that the storage compartment may also be left open in an intermediate position.

The front panel of the storage apparatus also preferably has bent leg portions on the top and bottom margins of the front panel, to provide a recessed area on one flat side of the panel, into which the top panel may be folded. Once the top panel is folded into this recess, the two panels may be together laid flat upon floor of the truck bed to provide access to essentially all of the utility area of the truck bed.

Other aspects and advantages of the invention will become apparent from the following detailed descrip-

BRIEF DESCRIPTION OF THE DRAWINGS

FIG. 6 is a vertical sectional view taken along line 6—6 of the FIG. 2;

FIG. 7 is an enlarged elevational sectional view taken along line 7—7 of FIG. 6;

FIG. 8 is an elevational sectional view taken along line 8—8 of FIG. 6;

FIG. 9 is a view similar to that of FIG. 8, showing the top panel in an intermediate position;

FIG. 10 is an enlarged partial section of portion 10 of FIG. 4;

FIG. 11 is an enlarged partial section of portion 11 of FIG. 4; and

FIG. 12 is an enlarged elevational sectional view taken along line 12—12 of FIG. 2.

DETAILED DESCRIPTION OF THE INVENTION

Figure 1:
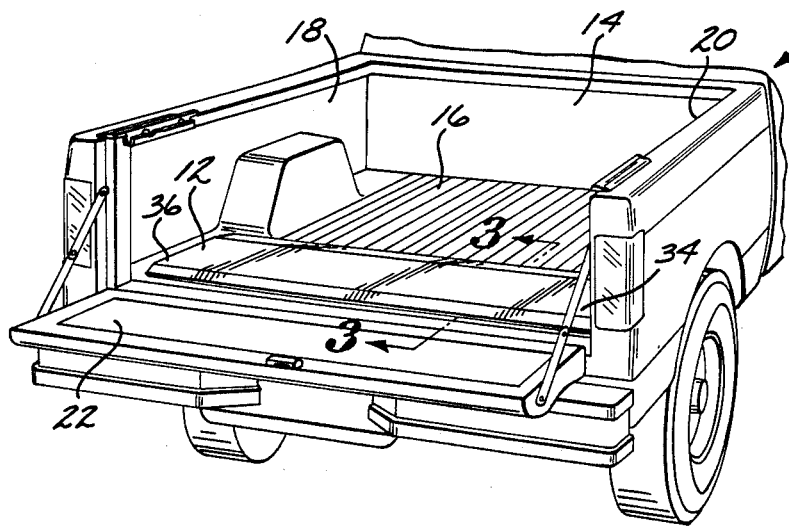
FIG. 1 is a perspective view of a truck bed of a pick up truck showing the panels of the storage apparatus in a folded position.

As is shown in the drawings for purposes of illustration, the invention is embodied in a collapsible security storage apparatus for use in combination with a truck bed, the storage apparatus having rigid, rectangular panel members adapted to extend between the right and left inner sidewalls of the truck bed, the panels having an unfolded configuration forming the storage compartment area with the truck bed and rear tailgate, and a folded, collapsed configuration in which the storage apparatus can be made to lie flat upon the floor of the truck bed. Storage compartments in truck beds which are removable or collapsible are generally subject to vandalism or theft, and there is a need for a storage compartment which is not only collapsible, but also may be made highly secure to prevent unauthorized access. Convertible storage compartments for truck beds generally have the problem of providing areas for purchase for prying the compartment open; or if the compartments are welded or otherwise permanently secured into place in order to prevent prying, the full open space of the truck bed is no longer available for use, such as for large cargo.

In accordance with the invention, there is provided a collapsible security storage apparatus for use in combination with a truck bed having right and left inner sidewalls, a front sidewall, a rear tailgate having raised lowered positions, and a floor, said security storage apparatus comprising:

(a) first and second rigid, rectangular panel members adapted to be positioned within the truck bed and extending between the right and left inner sidewalls, each panel member having first and second longitudinal edges and right and left edges extending between the longitudinal edges;

(b) means for hingedly mounting said first longitudinal edge of the first panel to the truck bed floor;

(c) means for hingedly securing the second longitudinal edge of the first panel to the first longitudinal edge of the second panel;

(d) track means adapted to receive the second panel member, the track means being adapted to be mounted on the right and left inner sidewalls, the track means comprising right and left brackets adapted to be mounted on the right and left inner sidewalls, respectively, each of the track brackets including first and second legs meeting at approximately a right angle, the first leg being adapted to be secured to either of the right or left inner sidewalls, and the second leg being adapted to receive either of the right or left edges of the second panel member whereby the second panel member may be extended to be received by the track means with the first and second panel members forming front and top sides, respectively, of a security storage compartment, the truck bed floor, and the right and left inner sidewalls cooperating with the first and second panel members and the floor, respectively, to form right and left sides of the security storage compartment;

(e) the second panel member being dimensioned such that the right and left sides of the second panel member are sufficiently close to the track means when the second panel is received by said track means to prevent purchase between the track means and each of the right and left sides of the second panel member; and (f) the second panel including means for releasably latching the second panel member to the rear tailgate when the rear tailgate is in a raised position, to thereby secure the security storage compartment against unauthorized access.

As is shown in the drawings, a truck bed 10 may be provided with a collapsible security storage unit 12. The truck bed generally comprises a front wall 14, a truck bed floor 16, a left inner sidewall 18, and a right inner sidewall 20. The rear portion of the truck bed may be closed by the rear tailgate 22.

Figure 2:
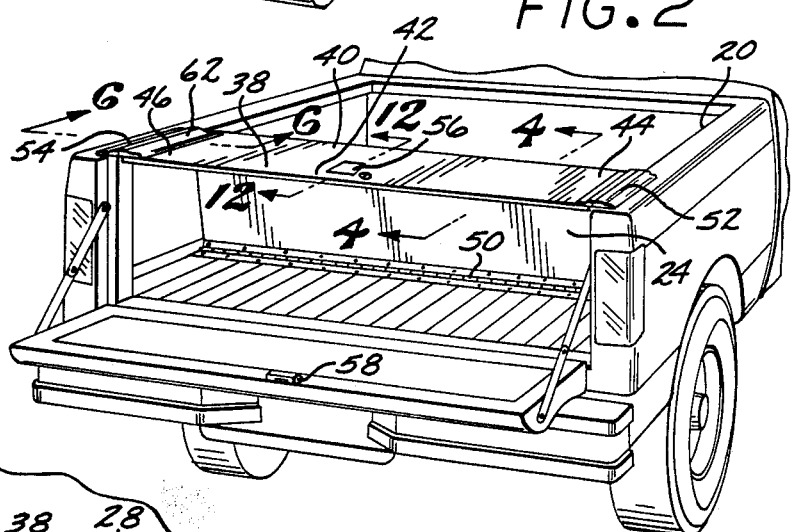
FIG. 2 is a perspective view of a truck bed of a pick up truck showing the panels in an extended position forming a storage compartment.
Figure 3:
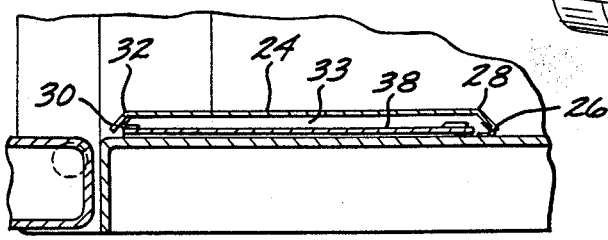
FIG. 3 is an elevational sectional view, taken along line 3—3 of FIG. 1.
Figure 4:
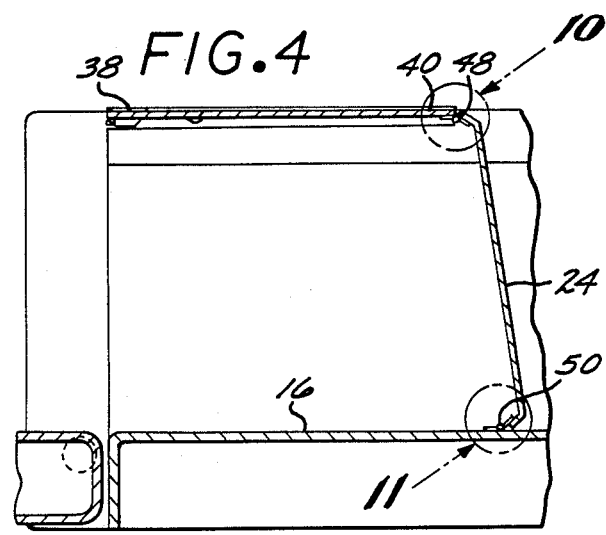
FIG. 4 is an elevational sectional view, taken along line 4—4 of FIG. 2.
Figure 5:
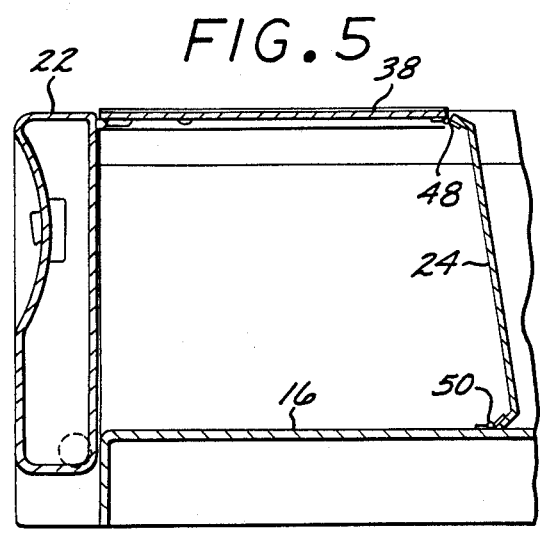
FIG. 5 is a elevational sectional view similar to FIG. 4 showing the rear tailgate in a raised position.

Referring to FIGS. 2 and 3, the first, front panel 24 has a first, bottom edge 26 with a bottom bent leg portion 28, and a second, top edge portion 30 with a top bent leg portion 32, with the two bent leg portions of the first rigid panel forming a recess 33 on the flat side of the first panel between the bent leg portions. When the first, front panel is folded to lay flat upon the truck bed floor, the second, top panel 38 at the same time may be folded within the recess of the first front panel.

The first, front panel has a right side 34 and a left side 36, and the second or top panel similarly has a right side 44 and a left side 46. The top panel has a first, front edge 40 secured to the front panel by a hinge 48, preferably a piano hinge. The bottom edge of the first, front panel is similarly secured to the floor of the truck bed by a hinge 50, preferably a piano hinge. Such hinges are shown by way of illustration in FIGS. 2–5 and 10–11.

When the second top panel is unfolded from its position within the recess of the first, front panel, the top panel may be extended to rest upon the right track member 52, which is adapted to be secured to the right inner sidewall 20 at the upper inner edge of the right sidewall, and upon the left track member 54, which is adapted to be secured to the left upper inner sidewall of the truck bed. Both the right track member and the left track member are preferably J-shaped brackets of the type illustrated in FIG. 6. A latch 56, which in the preferred embodiment may also be locked, is located on the rear of the second, top panel, to cooperate with the mating latching portion 58 on the rear tailgate. Any suitable means for locking 60 may be provided, but it is preferably a keyed lock.

In the preferred mode, the second, top panel has an adjustable "T" bracket 62 having two generally coplanar legs 61 and 63, and a third leg 65 generally perpendicular to the first two legs, adapted to be mounted on the right and left sides of the top panel, so that the width of the top panel may be finally adjusted to fit within the track brackets so as to leave a gap 64 between the top panel edge and the tracks which is insufficient to provide purchase for prying open the compartment.

In the preferred embodiment, the "J" track brackets have an upper leg 66 which is adapted to be bolted to the inner sidewalls of the truck bed, and a lower leg 68 forming approximately a right angle with the upper leg. Most preferably the lower leg has a flange 69 extending at an approximate right angle from the lower leg to form a "U" shaped channel with the upper leg. Referring to FIG. 6 a rear bolt 70 securing the "J" track bracket to the left inner sidewall leaves the bolt head 71 extending inwardly into the truck bed area. In the preferred embodiment, a rear bolt 70 and a front bolt 72 are provided. The top panel adjustable "T" brackets are preferably bolted to the right and left margins of the top panel member, the bolts extending through laterly extending longitudinal bolt holes, as is commonly known in the art. When adjusted properly, the "T" brackets are adapted to be received upon the lower leg of the "J" track bracket. Most preferably, the third leg 65 of the "T" bracket is received in the "U" shaped channel formed by the flange of the lower leg of the "J" bracket. The flange further allows for proper adjustment of the fit of the top panel with the sidewalls, and further secures the top panel against tampering. The preferred embodiment also provides for an "H" member 74 preferably secured to the "T" bracket by a screw 82, with the "H" bracket oriented in a position such that rear recess 78, formed by a pair of legs 79 of the "H" member faces rearwardly, and such that front recess 80 of the "H" member, formed by a pair of legs 81, faces forwardly, so that when the "T" bracket is received by the "J" track bracket, the "H" member is similarly received by the "J" track bracket. As is illustrated in FIGS. 6-9, when the second, top panel is extended to rest upon the track members, the top panel may slide rearwardly so that the head of the rear bolt may be received in the rear recess of the "H" member, thereby substantially preventing vertical movement of the top panel, and preventing opening of the compartment in this direction. Similarly, when the top panel member slides forwardly along the track members, the front recess of the "H" member will receive the front bolt, which will also result in the substantial prevention of movement of the top panel member in a direction normal to the surface of the top panel, and which will also result in the top panel member resting against the front bolt with the compartment partially opened in an intermediate position, for convenient access to contents of the compartment.

When the storage unit is in its unfolded, extended configuration to form a compartment, and it is desired to utilize the full storage space of the original truck bed, the top panel may slide forward so that the "H" member is between the front and rear bolts, allowing the top panel to be lifted upwardly, away from the track members, and folded within the recess formed by the bent leg portions of the front panel, which are illustrated in greater detail in FIGS. 10 and 11. The recess provided between the bent leg portions permits the top panel member to be hidden within the recess and neatly folded away on the floor of the truck bed.

In the foregoing description, it has been demonstrated that the collapsible security storage apparatus of the present invention may be extended to combine with the truck bed of a pick up truck to provide a high security storage compartment area which, when properly adjusted and locked, will provide little purchase for unauthorized entry. The storage apparatus of the present invention further provides for collapsing and folding of the storage unit to lie flat upon the floor of the truck bed, to allow for full utilization of the truck bed area for large cargos.

It is also significant that the security storage compartment in its extended position provides for the interlocking bolt and "H" members, which will substantially prevent entry into the storage compartment area by prying the top of the panel upward to open the compartment. This same arrangement also has the advantage of providing a second, intermediate position of the storage compartment for ready access to any tools or equipment within the compartment area.

From the foregoing it will be appreciated that the collapsible security storage apparatus according to the invention provides a simple to use and easy to access storage compartment which may be locked with confidence, and which may be quickly and easily stored away for full utilization of the truck bed area as it was originally intended.

Although one specific embodiment of the invention has been described and illustrated, it is clear it is susceptible to numerous modifications and embodiments within the ability of those skilled in the art and without the exercise of the inventive facility. Thus, it should be understood that various changes in form, detail and application of the present invention may be made without departing from the spirit and scope of this invention.

I claim:

1. A collapsible security storage apparatus for use in combination with a truck bed having right and left inner side walls, a front side wall, a rear tailgate having raised and lowered positions, and a floor, said security storage apparatus comprising:
   (a) first and second rectangular rigid panel members positioned within said truck bed and extending between said right and left inner side walls, each said panel member having first and second longitudinal edges and right and left edges interjacent said longitudinal edges;
   (b) means for hingedly mounting said first longitudinal edge of said first panel to said truck bed floor;
   (c) means for hingedly securing said second longitudinal edge of said first panel to said first longitudinal edge of said second panel;
   (d) track means adapted to receive said second panel member, said track means being mounted on said right and left inner side walls, said track means comprising right and left brackets mounted on said right and left inner sidewalls, respectively, each of said brackets including first and second legs meeting at approximately a right angle, said first leg being secured to either of said right or left inner side walls, and said second leg receive either of said right or left edges of said second panel member whereby said second panel member is extendable to be received by said track means, with said first and second panel members forming front and top sides, respectively, of a security storage compartment, said truck bed floor forming a floor, and said right and left inner side walls forming right and left sides, respectively, of said security storage compartment;

(e) said second panel member being dimensioned such that said right and left sides of said second panel member are sufficiently close to said track means when said second panel member is received by said track means to prevent purchase between said track means and each of said right and left sides of said second panel member;

(f) said second panel member including means for releasably latching said second panel member to said rear tailgate when said rear tailgate is in said raised position;

(g) retaining means for preventing substantially any movement of said second panel member in a direction normal to a plane formed by said second panel member comprising at least one first means secured to said first leg of said track bracket for interfitting with a cooperating second means for interfitting mounting on said second panel member wherein said first means for interfitting comprises at least one bolt secured to said first leg of said track bracket, and said second means for interfitting comprises at least one interfitting bracket having at least one recess receiving said bolt.

2. The security storage apparatus of claim 1, wherein said second panel member further includes right and left adjustable brackets mounted on the right and left edges of said second panel member, respectively, and adjustable brackets being adjustable in the longitudinal direction of said second panel member, whereby when said second panel member is received by said track means said right and left sides of said second panel member is adjustable to be sufficiently close to said track means to prevent purchase between said second panel member and said track means, and said at least one interfitting bracket being secured to at least one of said adjustable brackets, whereby when said second panel member is received by said track means and said interfitting bracket receives said bolt movement of said second panel member in a direction normal to the planar direction of receipt of said second panel member is substantially prevented.

3. The security storage apparatus of claim 2 wherein each of said interfitting brackets has a pair of recesses on opposite sides of said interfitting bracket, and each of said track brackets has at least two bolts secured thereto, whereby said second panel member may be retained in a position received on said track means substantially prevented from movement normal to the surface of said second panel member when said interfitting bracket receives one of said at least two bolts.

4. A collapsible security storage apparatus for use in combination with a truck bed having right and left inner side walls, a front side wall, a rear tailgate having raised and lowered positions, and a floor, said security storage apparatus comprising:

(a) first and second rectangular rigid panel members positioned within said truck bed and extending between said right and left inner side walls, each said panel member having first and second longitudinal edges and right and left edges interjacent said longitudinal edges;

(b) means for hingedly mounting said first longitudinal edge of said first panel to said truck bed floor;

(c) means for hingedly securing said second longitudinal edge of said first panel to said first longitudinal edge of said second panel;

(d) track means adapted to receive said second panel member, said track means being mounted on said right and left inner side walls, said track means comprising right and left brackets mounted on said right and left inner sidewalls, respectively, each of said brackets including first and second legs meeting at approximately a right angle, said first leg being secured to either of said right or left inner side walls, and said second leg receive either of said right or left edges of said second panel member whereby said second panel member is extendable to be received by said track means, with said first and second panel members forming front and top sides, respectively, of a second storage compartment, said truck bed floor forming a floor, and said right and left inner side walls forming right and left sides, respectively, of said security storage compartment;

(e) said second panel member being dimensioned such that said right and left sides of said second panel member are sufficiently close to said track means when said second panel member is received by said track means to prevent purchase between said track means and each of said right and left sides of said second panel member;

(f) said second panel member including means for releasably latching said second panel member to said rear tailgate when said rear tailgate is in said raised position; and (g) adjusting means for lengthening or shortening the longitudinal dimension of second panel mounted on the right and left edges of said second panel member, respectively, wherein said adjusting means comprises a generally "T"-shaped adjusting bracket having generally coplanar first and second legs and a third leg generally perpendicular to said first two legs, and said track bracket second leg includes a flange extending at approximately a right angle from said second leg to form a channel with said track bracket first leg receiving said adjusting bracket third leg whereby said right and left sides of said second panel member may be adjusted to be sufficiently close to said track means to prevent purchase between said second panel member and said track means.

* * * * *